United States Patent
Pancholi

(10) Patent No.: US 10,841,293 B2
(45) Date of Patent: Nov. 17, 2020

(54) GATEWAY DEVICE FOR AUTHENTICATION AND AUTHORIZATION OF APPLICATIONS AND/OR SERVERS FOR DATA TRANSFER BETWEEN APPLICATIONS AND/OR SERVERS

(71) Applicant: Bank of America Corporation, Charlotte, NC (US)

(72) Inventor: Vaibhav Ashokbhai Pancholi, Singapore (SG)

(73) Assignee: Bank of America Corporation, Charlotte, NC (US)

( * ) Notice: Subject to any disclaimer, the term of this patent is extended or adjusted under 35 U.S.C. 154(b) by 249 days.

(21) Appl. No.: 16/149,311

(22) Filed: Oct. 2, 2018

(65) Prior Publication Data

US 2020/0106763 A1    Apr. 2, 2020

(51) Int. Cl.
*H04L 29/06* (2006.01)
*H04L 9/32* (2006.01)
*H04W 12/08* (2009.01)
*H04W 12/06* (2009.01)
*H04W 88/16* (2009.01)

(52) U.S. Cl.
CPC ........ *H04L 63/0807* (2013.01); *H04L 9/3213* (2013.01); *H04L 63/10* (2013.01); *H04W 12/06* (2013.01); *H04W 12/08* (2013.01); *H04W 88/16* (2013.01)

(58) Field of Classification Search
CPC ... H04L 63/0807; H04L 9/3213; H04L 63/10; H04W 12/08; H04W 12/06; H04W 88/16
See application file for complete search history.

(56) References Cited

U.S. PATENT DOCUMENTS

| 7,676,431 B2 | 3/2010 | O'Leary et al. |
| 7,849,010 B2 | 12/2010 | Deyoe et al. |
| 8,069,121 B2 | 11/2011 | Goodrich et al. |
| 8,255,325 B2 | 8/2012 | May et al. |
| 8,352,360 B2 | 1/2013 | De Judicibus et al. |
| 8,738,529 B2 | 5/2014 | Kolhatkar et al. |
| 8,812,401 B2 | 8/2014 | Kendrick et al. |
| 2010/0280909 A1 | 11/2010 | Zhang et al. |

(Continued)

OTHER PUBLICATIONS

"Connecting Payments Systems—Modo Payments" https://modopayments.com/ website visited Sep. 24, 2018, pp. 1-4.

(Continued)

*Primary Examiner* — Christopher C Harris
(74) *Attorney, Agent, or Firm* — Banner & Witcoff, Ltd.; Michael A. Springs

(57) ABSTRACT

A method, apparatus, computer-readable medium, and/or system may be used to facilitate secured communications between internal and external applications and/or computing devices. For example, a gateway device may generate access tokens for internal applications, such as application programming interfaces (APIs), and/or external services. Access tokens may comprise various types of information used for authentication or authorization, such as client secrets, grant types, and/or client identifiers. Using one or more access tokens, internal applications may access data from external services. Similarly, external services may access data from internal applications using one or more access tokens.

17 Claims, 3 Drawing Sheets

(56) References Cited

U.S. PATENT DOCUMENTS

| | | | |
|---|---|---|---|
| 2011/0282780 A1 | 11/2011 | French et al. | |
| 2016/0065555 A1* | 3/2016 | Branden | H04L 63/0807 726/7 |
| 2016/0086174 A1 | 3/2016 | Koraichi et al. | |
| 2018/0324204 A1* | 11/2018 | McClory | G06F 8/71 |
| 2019/0103968 A1* | 4/2019 | Srinivasan | G06F 21/41 |
| 2019/0165942 A1* | 5/2019 | Subramaniam | G06F 9/30018 |
| 2019/0372993 A1* | 12/2019 | Dunjic | H04L 63/10 |
| 2019/0394041 A1* | 12/2019 | Jain | H04L 9/3213 |
| 2020/0076794 A1* | 3/2020 | de Boer | H04L 63/102 |

OTHER PUBLICATIONS

"Payment Services Directive: Commission encourages swift and coherent implementation at national level" European Commision—Press Release http://europa.eu/rapid/press-release_IP-07-1914_en.htm?locale=en website visited Sep. 24, 2018, pp. 1-2.

"Date and time format—ISO 8601" International Organization for Standardization https://www.iso.org/iso-8601-date-and-time-format.html website visited Sep. 18, 2018, pp. 1-2.

"Introduction to JSON Web Tokens" https://jwt.io/introduction/ website visited Sep. 5, 2018, pp. 1-10.

"Introducing JSON" https://json.org/ website visited Sep. 5, 2018, pp. 1-7.

"Open Banking" Investopedia https://www.investopedia.com/terms/o/open-banking.asp website visited Sep. 18, 2018, pp. 1-4.

"Join RippleNet" https://ripple.com website visited Sep. 24, 2018, pp. 1-13.

"Send Money, Pay Online or Set Up a Merchant Account—PayPal" PayPal https://paypal.com/us/home website visited Sep. 24, 2018, pp. 1-2.

"What is B2B Integration?" B2B Integration http://www.b2bintegration.co.uk/what-is-b2b-integration website visited Sep. 5, 2018, p. 1.

"What is ERP?" Oracle http://netsuite/com/portal/resource/articles/erp/what-is-erp.shtml website visited Sep. 18, 2018, pp. 1-6.

"Anatomy of a Simple Web Token (SWT)" Badri's Blog https://lbadri.wordpress.com/2012/07/30/anatomy-of-a-simple-web-token-swt/ website visited Sep. 24, 2018, pp. 1-8.

\* cited by examiner

GATEWAY DEVICE FOR AUTHENTICATION AND AUTHORIZATION OF APPLICATIONS AND/OR SERVERS FOR DATA TRANSFER BETWEEN APPLICATIONS AND/OR SERVERS

TECHNICAL FIELD

One or more aspects of the disclosure generally relate to computing devices, computing systems, and computer software. In particular, one or more aspects of the disclosure generally relate to computing devices, computing systems, and computer software that may be used to facilitate secured communications between internal and external applications and/or computing devices.

BACKGROUND

Computing devices and/or applications running thereon may desire to access data from other computing devices and/or applications running thereon. An application desiring access to data from another application may communicate directly with the other application to access the data. However, the application desiring access to data may need to know the other application's communication protocol, network address, security protocols, data formatting, and various other configuration parameters in order to communicate with the other application and obtain the desired data. This may lead to processing inefficiencies and delays if each application needs to establish protocols with and know parameters of the other applications in order to request and access their data. For example, the application may need to format its messages according to the other application's communication and security protocols, may need to know the other application's external network address, and the like. This is especially true if there are hundreds or thousands of applications, and each application desires to be able to communicate with and request data from other applications.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A method, apparatus, computer-readable medium, and/or system may comprise a gateway device and one or more computing devices associated with one or more applications. The gateway device may comprise a processor and memory storing computer-executable instructions that, when executed by the processor of the gateway device, cause the gateway device to perform various steps. For example, the gateway device may receive, from the computing device associated with the application, a request for a token. The request may comprise one or more of a secret associated with the application or an identifier associated with the application. Based on the request for the token, the gateway device may send, to the computing device, the token. The gateway device may receive, from the computing device, a first request for data from an external service. The first request for data may comprise the token. Additionally or alternatively, the first request for data may comprise one or more parameters for the data. Based on the first request for data from the external service, the gateway device may determine the external service. The gateway device may send, to the external service, a second request for data. The second request for data may comprise the one or more parameters for the data.

In some examples, the computing device may comprise a processor and memory storing computer-executable instructions that, when executed by the processor of the computing device, cause the computing device to perform one or more additional steps. For example, the computing device may generate the first request for data from the external service by adding the token to the first request for data. The computing device may send, to the gateway device, the first request for data with the token added to the first request for data.

In some examples, the request for the token may comprise the secret associated with the application, the identifier associated with the application, and/or a grant type associated with the application. The application may comprise an application programming interface (API). Additionally or alternatively, the API may be associated with one or more internal applications requesting the data.

In some examples, the memory of the gateway device may store computer-executable instructions that, when executed by the processor of the gateway device, cause the gateway device to perform one or more additional steps. For example, before sending the token, the gateway device may authenticate the application based on one or more of the secret associated with the application or the identifier associated with the application. Sending the token may be based on authenticating the application.

In some examples, a header field of the first request for data from the external service may comprise the token, and receiving the first request for data from the external service may comprise receiving the first request for data having the header field comprising the token. Additionally or alternatively, the first request for data may be encrypted using the token, and the memory of the gateway device may store computer-executable instructions that, when executed by the processor of the gateway device, cause the gateway device to decrypt the first request for data based on the token.

In some examples, the memory of the gateway device may store computer-executable instructions that, when executed by the processor of the gateway device, cause the gateway device to perform one or more additional steps. For example, the gateway device may send, to the external service, a request for a second token. The request for the second token may comprise one or more of a secret associated with the gateway device or an identifier associated with the gateway device. The gateway device may receive, from the external service, the second token. The gateway device may add the second token to the second request for data. Sending the second request for data may comprise sending the second request for data with the second token added to the second request for data.

In some examples, the memory of the gateway device may store computer-executable instructions that, when executed by the processor of the gateway device, cause the gateway device to perform one or more additional steps. For example, after determining the external service, the gateway device may determine, based on a mapping of external identifiers for external services to internal identifiers for the external services, an external identifier for the external service. Sending the second request for data may comprise sending, to the external service and via the external identifier for the external service, the second request for data.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
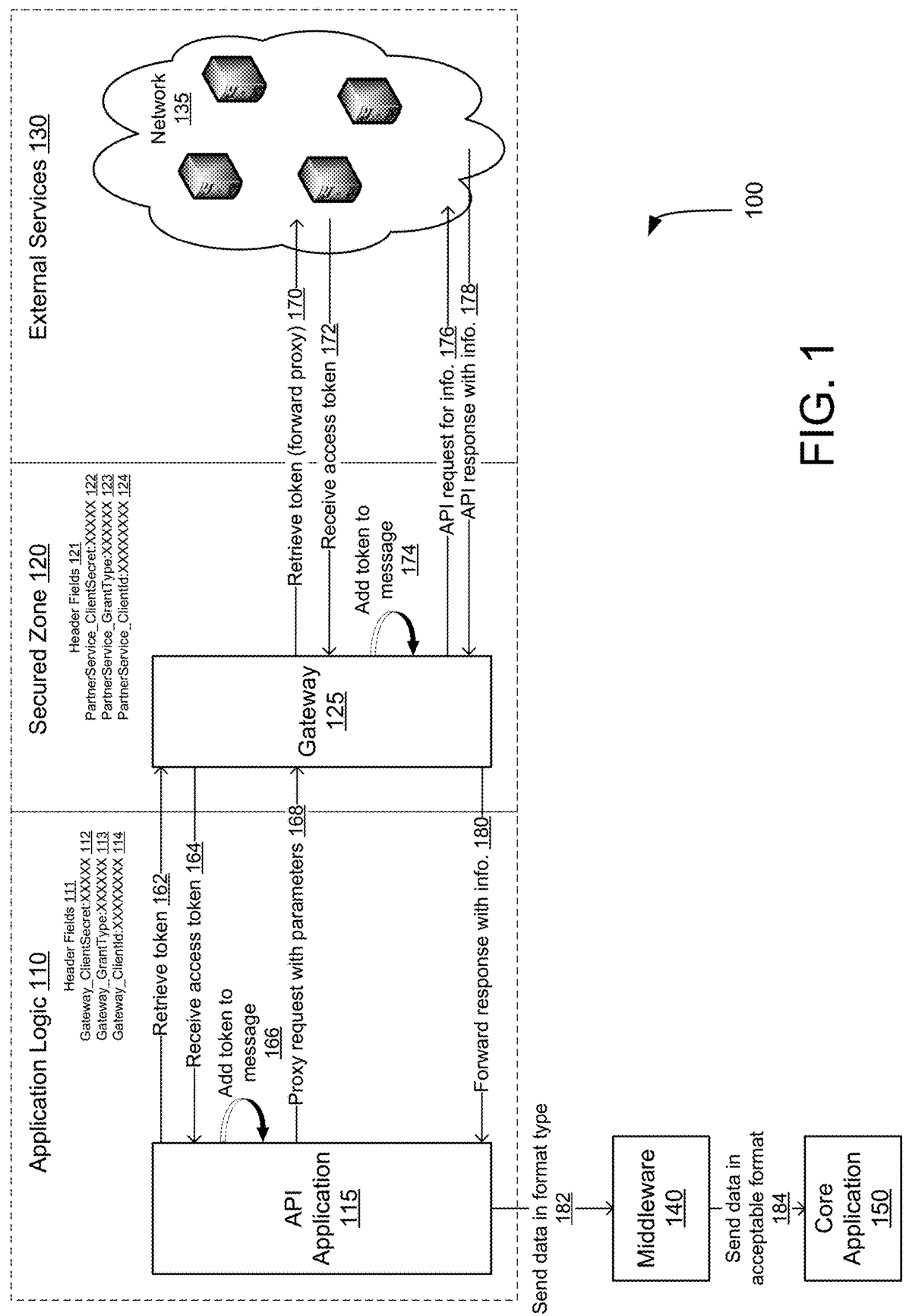
FIG. 1 illustrates an example operating environment and method in which various aspects of the disclosure may be implemented.

FIG. 1 illustrates an example operating environment and method in which various aspects of the disclosure may be implemented. An illustrative system 100 for implementing methods according to the present disclosure is shown. The system 100 may comprise application logic 110, such as an application programming interface (API) application 115 and/or other API applications (now shown). The API application 115 may comprise, for example, an API consumer application for receiving and consuming data from external sources and/or an API provider application for providing data to external sources. Although not illustrated, the application logic 110 may include other applications, and each application may be used, for example, for a different purpose. In some examples, the application logic 110 may comprise business logic, and the applications within the application logic 110 (e.g., API application 115) may comprise business applications. The API application(s) 115 may comprise applications running internally within an entity, such as a financial institution.

The system 100 may comprise a gateway device 125 within a secured zone 120. The secured zone 120 may function as an entry point for one or more external services 130 to communicate with internal applications. The secured zone 120 may protect internal applications, such as application 115, middleware 140, core application 150, or other internal applications and computing devices used to run the applications. The gateway 125 may be within the secured zone 120 and may be used to facilitate communications between internal devices and applications (e.g., application 115) and external services 130. For example, the gateway 125 may provide secure authentication, authorization, and/or audit of data transmitted between the application logic 110 and/or for external service(s) 130. Internal applications and/or APIs may connect with external APIs and/or services using varied security mechanisms, which may be transparent to the internal APIs and/or applications. Integration security may be provided by any type of protocol for authenticating and authorizing internal services, such as the application 115 and/or the core application 150, to access data from external service(s) 130 and/or external service(s) 130 to access data from internal services. As will be described in further detail below, communications via the gateway 125 may be secured using one or more tokens, which may be added to messages being transmitted via the gateway 125.

The system 100 may comprise a plurality of external services 130. External services 130 may comprise, for example, one or more of treasury management systems, partner banks, payment networks, third party providers, financial technology (Fintech) providers, client enterprise resource management (ERP) integration services, Internet of Things (IoT) providers, digital banks, mobile payment platforms, blockchain providers, and/or other external services or their externally hosted APIs. External services 130 may be located within or connected to one or more external networks 135, such as the internet. Other examples of external networks include an intranet, a wide-area network (WAN), a local-area network (LAN), a wireless network, a digital subscriber line (DSL) network, a frame relay network, an asynchronous transfer mode (ATM) network, a virtual private network (VPN), a cellular network, or any combination of any of the same. The external services 130 may comprise, for example, an API consumer for receiving and consuming data from the application 115 or other internal applications and/or an API provider for providing data to the application 115 or other internal applications.

The system 100 may comprise middleware 140. Middleware 140 may comprise internal applications and/or services for converting data to different formats based on format preferences or requirements of application 115, external services 130, and/or core application 150. The system 100 may also comprise one or more core applications 150. The core applications 150 may also comprise internal applications and/or services within, for example, a financial institution. In some examples, the API application(s) 115 may comprise API(s) for the core application(s) 150. One or more of the devices shown in FIG. 1 (and FIG. 2) may be used to facilitate secured data transfers between external services 130 and/or one or more internal applications (e.g., the consumer application 115, core application 150, and the like).

With reference to FIG. 1, in step 162, the API consumer application 115 may attempt to retrieve a token from the gateway 125. The application 115 may send, to the gateway 125, a request for the token. The token request may comprise data 111, such as a client secret 112 (e.g., Gateway_Client-Secret), a grant type 113 (e.g., Gateway_GrantType), and/or a client identifier 114 (e.g., Gateway_ClientId). The client identifier 114 may comprise an identifier for the application 115 that the gateway 125 may use to authenticate the request. The client secret 112 may comprise a secret known by the application 115 and the gateway 125, and the client secret 112 may be used by the gateway 125 to authenticate the application 115 and/or its requests. For example, the client secret 112 may comprise a string of characters, such as ABCD or J7TY229. The grant type 113 may be used by the gateway 125 to confirm the application's authority to access different types of data with different levels of permissions. Grant types 113 may indicate, for example, whether the application 115 is authorized for read only access, read and write access, super user access, and the like. One or more pieces of the data 111 may be included in one or more fields of the token request message, such as in the header fields.

The gateway 125 may receive the request for the token from the application 115 and may determine whether to send an access token to the application 115. For example, the gateway 125 may authenticate and/or authorize the request from the application 115, which may be based on one or more pieces of data included in the request. As previously explained, the gateway 125 may authenticate and/or authorize the application 115 based on, for example, the client secret 112, the grant type 113, the client identifier 114, and/or other pieces of data, which may be included in the token request.

In step 164, if the gateway 125 authenticates and/or authorizes the application 115, the gateway 125 may generate and/or send a token to the application 115. The token may comprise an access token, such as a JSON (JavaScript Object Notation) Web Token (JWT) or other types of tokens. The token may be used by the application 115 to request and access data from one or more external services 130 and/or send data to one or more external services 130, which may request data from one or more internal applications. The token may be time-limited. If an expiration time of the token expires, the application 115 may request, from the gateway 125, a new token with a new expiration time. The expiration time may be preconfigured, such as by an administrator. Other internal applications in the application logic 110 (not shown) may similarly request and receive access tokens from the gateway 125. The internal application may use its token to request data from or send data to an external service 130 via the gateway 125.

Steps 162 and 164 may be performed at any time, such as prior to the application 115 requesting access to data from an external service 130. For example, the application 115 may request and receive an access token as part of an onboarding process for the application 115. The client ID 114, grant type 113, and/or client secret 112 may be obtained during the onboarding process.

At any point in time, the application 115 or another internal application, such as the core application 150, may desire to access data from one or more external service 130. In step 166, the application 115 may add the token to a message for requesting data from an external service 130. For example, the application 115 may encrypt the message with the token. Because the gateway 125 provided the token, the gateway 125 may be able to decrypt the message using the same token. Additionally or alternatively, the application 115 may add the token or data from the token to a header field of the message for requesting data from the external service 130.

In step 168, the application 115 may send, to the gateway 125, a request for data from one or more external services 130, which may be provided by external entities. The request may comprise an API call to an API provider of an external entity. The request may comprise one or more parameters for the requested data. For example, the data may comprise an account statement with an external service 130, such as a partner bank, and the request may comprise a request to obtain the account statement. The parameters for the request may comprise, for example, an account number for the account, a start date for the account data, and/or an end date for the account data. In some examples, the request may comprise a Business-to-Business integration (B2BI) request. The request for data from an external service 130 may comprise the token added to the request (e.g., added in step 166). For example, the request may be encrypted with the token. Additionally or alternatively, a header field of the request may comprise the token and/or data therefrom. As previously explained, the token may include a client secret, a grant type, and/or a client ID. The gateway 125 may decrypt the encrypted message and/or the access token used to encrypt the message in order to access the message. For example, the gateway 125 may decrypt the message to access an identifier of the application 115, an appropriate mapping to an external service 130, and the like.

An example of requesting an account statement is described above. However, the process shown in FIG. 1 may be used to request any type of data from one or more external service(s) 130. For example, a request may comprise a request to perform a transaction with an external service 130 (e.g., another financial institution), such as to initiate payment between an internal account and an account with the other financial institution. Payment initiation may allow users to send payment instructions in real-time, such as from mobile devices or an enterprise resource planning system. A request may comprise an inquiry to determine a user's balance with one or more external financial institutions and/or external accounts. Balance inquiries may give the user the opportunity to access their balances, such as from a mobile device or from a treasury measurement system. The request may comprise a transaction inquiry, which may allow users to access transaction history information and other details whenever desired by the user. The request may comprise a request to validate a user's account at an external financial institution. The request may comprise a request to post information into an external accounting module. The request may comprise a request to confirm an alias of a customer, such as a mobile number, a social security number, an email, and the like.

In step 168, the gateway 125 may receive the request from the application 115. The gateway 125 may, for example, decrypt the request encrypted using the token. As previously explained, the gateway 125 may act as a proxy between the application 115 (and other internal applications) and a plurality of external services 130. For example, the application 115 and/or other internal applications might not have direct access to external services 130. In some examples, the application 115 might not know the external identifier (e.g., a URL) for the external service 130 in or connect to an external network 135. The gateway 125 may be used to correlate the application 115's data request to an external identifier for an external entity. For example, the gateway 125 may include a mapping that maps internal identifiers (e.g., names of external entities, internal identifiers for external entities, internal identifiers for APIs of external entities, proxy URLs, and the like) to actual URLs for the external entities. For example, an external URL for a first external entity (e.g., a first partner bank) may be http://get\*\*account\*\*statement.first\*\*partner\*\*bank.com. As another example, an external URL for a second external entity (e.g., a second partner bank) may be http://get\*\*account\*\*statement.second\*\*partner\*\*bank.com. By using the gateway 125 to communicate with external services 130, the application 115 (or other internal applications) might not need to know the external identifier (e.g., a URL) for external services 130. Rather, the application 115 might only need to know the address of the gateway 125, and the gateway 125 may determine the appropriate external identifier.

Using the gateway 125 to send and receive messages may be technologically advantageous because the internal applications 115 might be able to process and generate messages without having to first determine the appropriate external service's URL, which may speed up processing and delivery of data. Moreover, internal applications might not need to know the format, queues, folders, and/or other parameters for delivering messages to external services 130. Rather, the gateway 125 may translate messages into the proper format before sending them to the external service 130 and/or the application 115. Moreover, once an application 115 is internally onboarded, the application 115 may be able to call the gateway 125 (or the gateway 125 may be able to call the application 115) very quickly and at any point in time. For example, client onboarding may be fast with minimal code changes, which may be an effective solution compared to traditional file/message methods. Internal applications and APIs and/or external APIs may be quickly registered with the gateway 125 because the gateway 125 may map internal identifiers to actual URLs, allowing internal and external APIs and applications to more quickly exchange data. Thus, the gateway 125 may act as a one-point shop and lightweight solution for internal applications to access external services 130, such as partner bank information. As previously explained, the gateway 125 may also be used to secure messages transmitted to and received from external services 130.

In step 170, the gateway 125 may attempt to retrieve a token from the external service 130. The gateway 125 may send, to the external service 130, a request for the token. The gateway 125 may send the request to a forward proxy for the external service 130, such as an actual URL for the external service 130. The token request may comprise data 121, such as a client secret 122 (e.g., PartnerService_ClientSecret), a grant type 123 (e.g., PartnerService_GrantType), and/or a client identifier 124 (e.g., PartnerService_ClientId). The client identifier 124 may comprise an identifier for the gateway 125 that the external service 130 may use to authenticate a request for data. The client secret 122 may comprise a secret known by the gateway 125 and the external service 130, which may be used by the external service 130 to authenticate the gateway 125 and/or its request for data. The grant type 123 may be used by the external service 130 to confirm the gateway 125's authority to access different types of data with different levels of permissions. Grant types 123 may indicate, for example, read only access, read and write access, super user access, and the like. One or more pieces of the data 121 may be included in one or more fields of the token request message, such as in the header fields.

The external service 130 may receive the request for the token from the gateway 125 and may determine whether to send an access token to the gateway 125. For example, the external service 130 may authenticate and/or authorize the request from the gateway 125, which may be based on one or more pieces of data included in the request. As previously explained, the external service 130 may authenticate and/or authorize the gateway 125 based on, for example, the client secret 122, the grant type 123, the client identifier 124, and/or other pieces of data, which may be included in the token request. The external service 130 may have access to an authentication and/or authorization server for authenticating the gateway 125 and/or its request.

In step 172, if the external service 130 authenticates and/or authorizes the gateway 125, the external service 130 may generate and/or send a token to the gateway 125. As previously explained, the token may comprise an access token, such as a JWT. The token may be used by the gateway 125 to request and receive data from one or more external services 130, on behalf of the application 115 and other internal applications, and/or send data from the application 115 or other internal applications to the external service 130. The token may be time-limited. If an expiration time of the token expires, the gateway 125 may request, from the external service 130, a new token with a new expiration time. The expiration time may be preconfigured, such as by an administrator. The gateway 125 may similarly request and receive access tokens from other external entities or services 130, such as other partner banks. The access token corresponding to an external entity or service 130 may be used by the gateway 125 to request data from or send data to the external entity or service 130, on behalf of one or more internal applications.

Steps 170 and 172 may be performed at any time, such as prior to the gateway 135 requesting, on behalf of the application 115, data from an external service 130. Before the gateway 125 requests and receives an access token from the external service 130, the external service 130 may have gone through an onboarding process with the gateway 125. Accordingly, the gateway 125 may register external services 130 and/or their APIs prior to requesting or sending data to those external services 130.

In step 174, the gateway 125 may add the token to a message for requesting data from the external service 130. For example, the gateway 125 may encrypt the message with the token. Because the external service 130 provided the token, the external service 130 may be able to decrypt the message using the same token. Additionally or alternatively, the gateway 125 may add the token or data from the token to a header field of the message for requesting data from the external service 130.

In step 176, the gateway 125 may send, to the external service 130, a request for data from the external service 130, which may be provided by external entities. The request may comprise an API request to an API provider of the external entity 130. In some examples, the request from the gateway 125 to the external service 130 may go through a Representational State Transfer (REST) API. The request may comprise one or more parameters for the requested data. For example, assume that the requested data is an account statement with the external service 130, such as a partner bank. The request in step 176 may comprise a request to obtain the account statement. The parameters for the request comprise, for example, the account number for the account data, the start date for the account data, and/or the end date for the account data. The request for data from the external service 130 may comprise the access token previously received by the gateway 125 from the external service 130. For example, the request may be encrypted with the token. The external service 130 may decrypt the encrypted message and/or the access token used to encrypt the message to access the message and its contents. For example, the external service 130 may access the account number, the start date for account data, the end date for account data, and the like.

In step 178, the external service 130 may return, such as via an appropriate API, the requested data. In the account statement example, the external service 130 may comprise account information for a particular account associated with the account number from the specified start date to the specified end date. The gateway 125 may receive the data from the external service 130. In some examples, the response from the external service 130 to the gateway 125 may go through a REST API. The gateway 125 may transform or otherwise process the data. For example, the gateway 125 may convert the data received from the external service 130 to a format that the application 115 understands and can consume.

In step 180, the gateway 125 may send, to the application 115, the requested data. For example, the data may comprise account statement data for an account number from the specified start date to the specified end date. The gateway 125 may send the data after processing it as previously explained or may forward the data to the application 115 without processing it.

In step 182, the application 115 may send, to the middleware 140, the requested data in a particular format type that the middleware 140 can understand. For example, if the requested data includes time and/or date information, the application 115 may convert the requested data to a universal date and time format, such as International Organization for Standardization (ISO) 8601 format. For example, a date of Mar. 12, 2022 may be converted to 2022-03-12. If the requested data is already in a format understandable or desired by the middleware 140, the application 115 might not need to convert the requested data before sending it to the middleware 140.

In step 184, the middleware 140 may send, to the core application 150, the requested data in a format acceptable to the core application 150. For example, the core application 150 may comprise a core banking application, and the core banking application may expect or desire the data in a particular format. The desired format may be preconfigured by, for example, an administrator.

Figure 2:
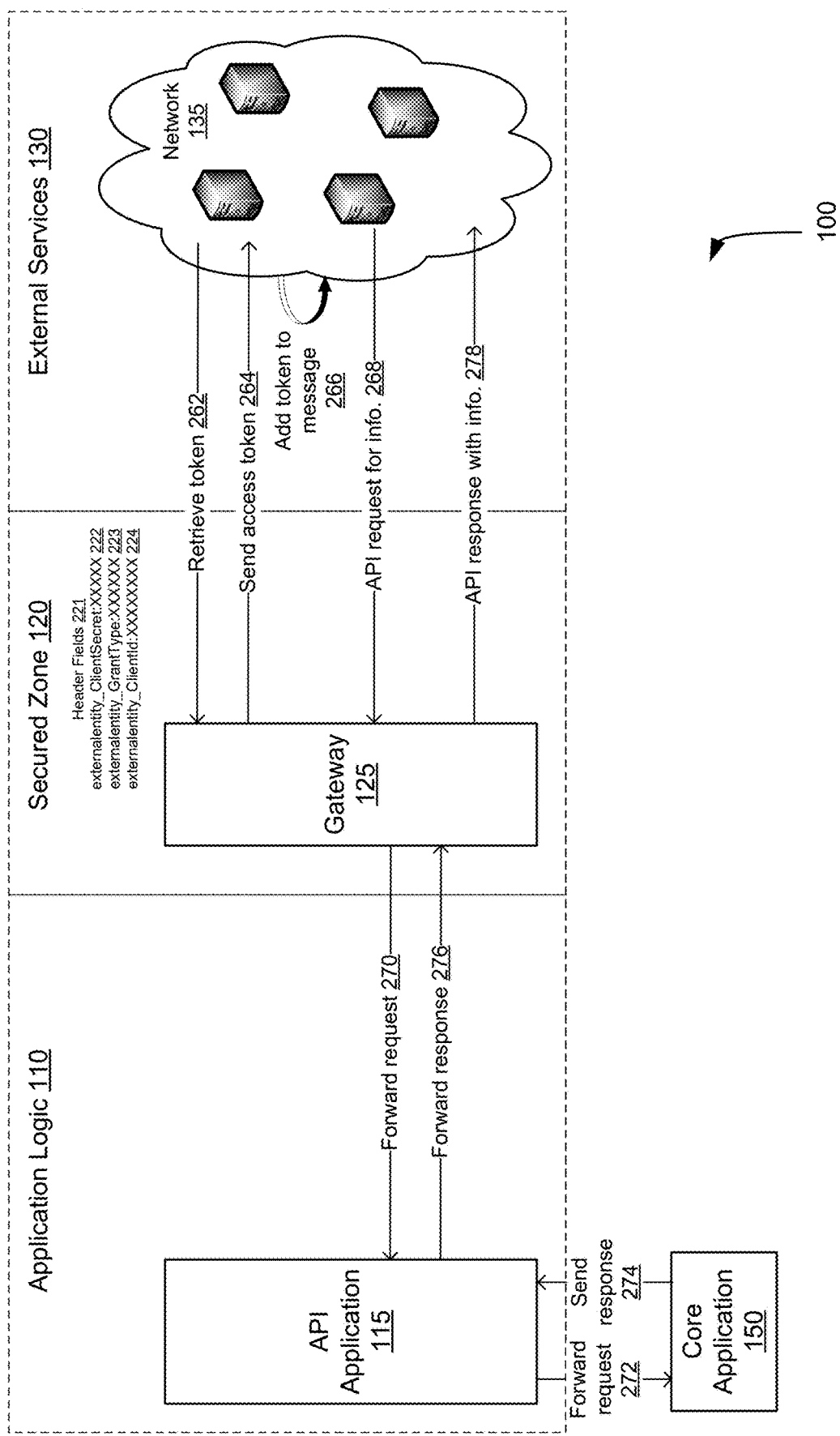
FIG. 2 illustrates another example operating environment and method in which various aspects of the disclosure may be implemented.

FIG. 2 illustrates another example operating environment and method in which various aspects of the disclosure may be implemented. For example, an external service 130 may desire to access data from an internal application, such as the API application 115 and/or the core application 150. As previously explained, tokens may be used to secure requests for data and the data itself.

In step 262, an external service 130 may attempt to retrieve a token from the gateway 125. The external service 130 may send, to the gateway 125, a request for the token. The token request may comprise data 221, such as a client secret 222 (e.g., externalentity_ClientSecret), a grant type 223 (e.g., externalentity_GrantType), and/or a client identifier 224 (e.g., externalentity_ClientId). The client identifier 224 may comprise an identifier for the external service 130 that the gateway 125 may use to authenticate the request. The client secret 222 may comprise a secret known by the external service 130 and the gateway 125, and the client secret 222 may be used by the gateway 125 to authenticate the external service 130 and/or its token request. The grant type 223 may be used by the gateway 125 to confirm the external service's authority to access different types of data with different levels of permissions. One or more pieces of the data 221 may be included in one or more fields of the token request message, such as in the header fields.

The gateway 125 may receive the request for the token from the external service 130 and may determine whether to send an access token to the external service 130. For example, the gateway 125 may authenticate and/or authorize the request from the external service 130, which may be based on one or more pieces of data included in the request. As previously explained, the gateway 125 may authenticate and/or authorize the external service 130 based on, for example, the client secret 222, the grant type 223, the client identifier 224, and/or other pieces of data, which may be included in the token request.

In step 264, if the gateway 125 authenticates and/or authorizes the external service 130, the gateway 125 may generate and/or send a token to the external service 130. As previously explained, the token may comprise an access token, such as a JWT. The token may be used by the external service 130 to request and access data from one or more internal applications (e.g., application 115, core application 150, and the like) and/or send data to one or more internal applications, which may request data from the external service 130. The token may be time-limited. For example, if an expiration time of the token expires, the external service 130 may request, from the gateway 125, a new token with a new expiration time. The expiration time may be preconfigured, such as by an administrator. Other external services 130 may similarly request and receive access tokens from the gateway 125. The external service may use its token to request data from or send data to the application 115 or other internal applications via the gateway 125.

At any point, the external service 130 may desire to access data from the application 115 and/or the core application 150 (or other internal applications). In step 266, the external service 130 may add the token to a message for requesting data from the application 115. For example, the external service 130 may encrypt the message with the token. Because the gateway 125 provided the token, the gateway 125 may be able to decrypt the message using the same token. Additionally or alternatively, the external service 130 may add the token or data from the token to a header field of the message for requesting data from the application 115.

In step 268, the external service 130 may send, to the gateway 125, a request for the desired information. The request may comprise an API request to the gateway 125. The request may comprise one or more parameters for the requested data (e.g., time information, date information, account information, and the like), as previously explained. Examples of desired data include account statements, a request to perform a transaction, payment initiation, balance inquiry, transaction inquiry, account validation, a request to post information, confirmation of a customer, and the like. As explained above, the request from the external service 130 to the gateway 125 may go through a REST API.

The request for data from the application 115 may comprise the token added to the request (e.g., added in step 266). For example, the request may be encrypted with the token. As previously explained, the token may include a client secret, a grant type, and/or a client ID. The gateway 125 may decrypt the encrypted message and/or the access token used to encrypt the message in order to access the message. For example, the gateway 125 may decrypt the message to access an identifier of the external service 130, an appropriate mapping to an internal application 115 and/or 150, and the like.

The gateway 125 may receive the request from the external service 130. As previously explained, the gateway 125 may act as a proxy between the application 115 (and other internal applications) and a plurality of external services 130. The gateway 125 may be used to correlate the external service's data request to an internal identifier for an internal application having access to the desired data, such as the application 115.

In step 270, the gateway 125 may determine the appropriate application to forward the request to (e.g., application 115). The gateway 125 may forward, to the application 115, the request for data from the application 115. The request may comprise an API request to the application 115. The request may comprise parameters for the requested data, which may have been provided by the external service 130 requesting the data.

In step 272, the application 115 may forward the request to the corresponding internal application that has access to the data desired by the external service 130, such as the core application 150 or another application or channel. The core application 150 may identify the appropriate data based on the parameters, such as from an internal database. In step 274, the core application 150 may send, to the application 115, a response comprising the desired data.

In step 276, the application 115 may forward, to the gateway 125, the response with the data desired by the external service 130. In an example of requesting an account statement, the data may comprise account information for a particular account associated with an account number from a specified start date to a specified end date. The gateway 125 may receive the data from the application 115. In some examples, the gateway 125 may transform or otherwise process the data. For example, the gateway 125 may convert the data received from the application 115 to a format that the external service 130 desires and can understand.

In step 278, the gateway 125 may send, to the external service 130, a response with the desired information. In some examples, the response from the gateway 125 to the external service 130 may go through a REST API.

Using the gateway 125 to facilitate communications between internal applications and/or APIs and external applications and/or APIs may result in various technological advantages. For example, the amount of traffic traversing networks may be reduced because the gateway 125 may aggregate data going in and out of the entity associated with the application 115 and/or core application 150. Moreover, use of the gateway 125 may make internal and external APIs more discoverable and reusable by internal and external entities. For example, the gateway 125 may be used to translate between internal identifiers and external identifiers, such as URLs.

Figure 3:
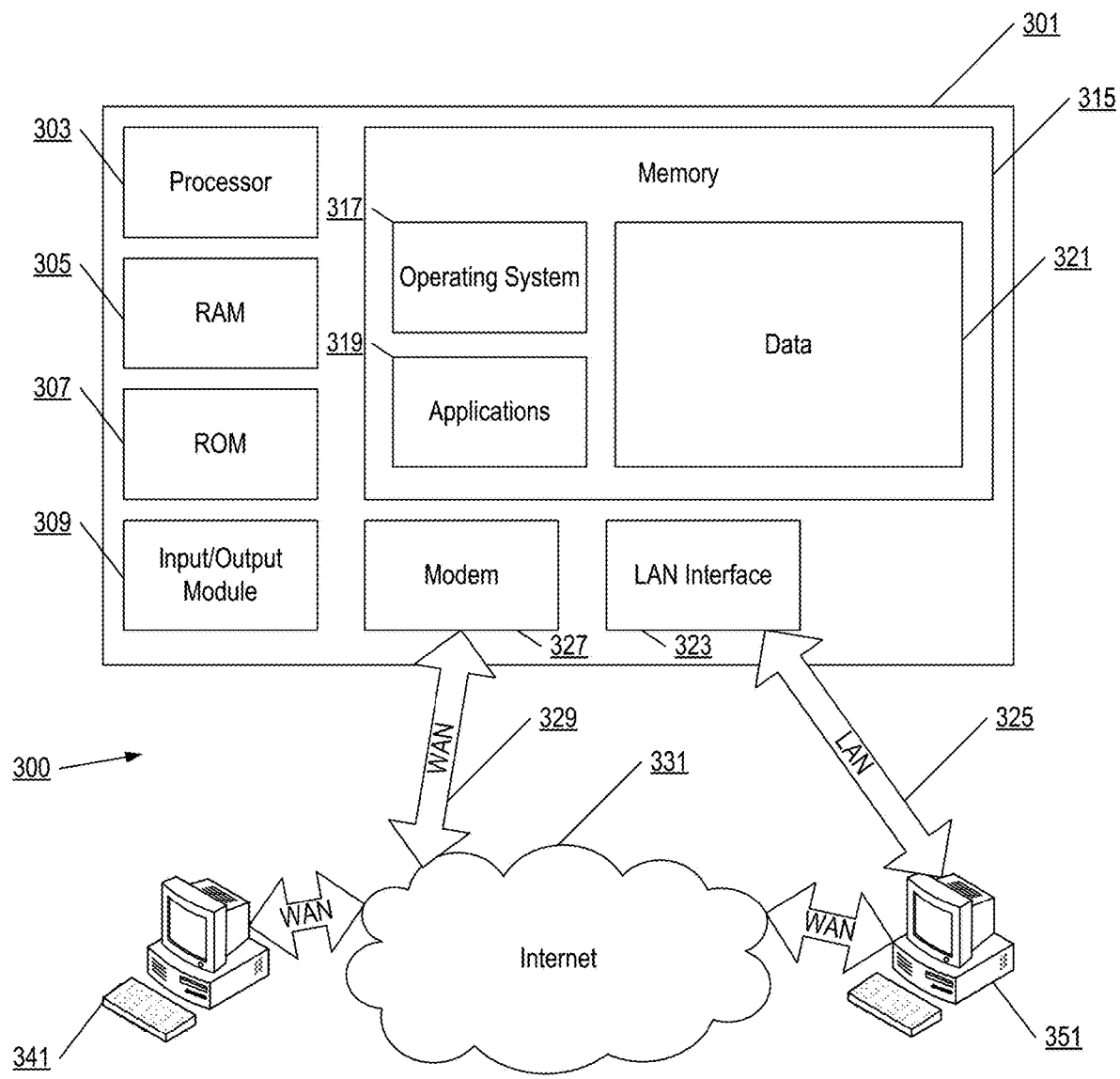
FIG. 3 illustrates an example operating environment in which various aspects of the disclosure may be implemented.

FIG. 3 illustrates an example block diagram of a computing device 301 (e.g., a computer server, desktop computer, laptop computer, tablet computer, other computing devices) in an example computing environment 300 that may be used according to one or more illustrative embodiments of the disclosure. For example, the gateway device 125 shown in FIG. 1 and FIG. 2 may include one or more of the components of the computing device 301, as will be described in further detail below. In some examples, internal applications, such as application 115, middleware 140, and/or core application 150, may be configured to execute on one or more computing devices including one or more of the components of the computing device 301, as will be described in further detail below. Similarly, external services 130 may be configured to execute on one or more external computing devices, which may include one or more of the components of the computing device 301 described below. In some examples, each external entity may have its own computing device(s).

The computing device 301 may have a processor 303 for controlling overall operation of the server and its associated components, including for example random access memory (RAM) 305, read-only memory (ROM) 307, input/output (I/O) module 309, and memory 315.

I/O module 309 may include, e.g., a microphone, mouse, keypad, touch screen, scanner, optical reader, and/or stylus (or other input device(s)) through which a user of computing device 301 may provide input, and may also include one or more of a speaker for providing audio output and a video display device for providing textual, audiovisual, and/or graphical output. Software may be stored within memory 315 and/or other storage to provide instructions to processor 303 for enabling computing device 301 to perform various functions. For example, memory 315 may store software used by the computing device 301, such as an operating system 317, application programs 319, and an associated database 321. Additionally or alternatively, some or all of the computer executable instructions for computing device 301 may be embodied in hardware or firmware (not shown).

The computing device 301 may operate in a networked environment supporting connections to one or more remote computers, such as terminals 341 and 351. The terminals 341 and 351 may be personal computers or servers that include any or all of the elements described above with respect to the computing device 301. The network connections depicted in FIG. 3 include a local area network (LAN) 325 and a wide area network (WAN) 329, but may also include other networks. When used in a LAN networking environment, the computing device 301 may be connected to the LAN 325 through a network interface or adapter 323. When used in a WAN networking environment, the computing device 301 may include a modem 327 or other network interface for establishing communications over the WAN 329, such as the Internet 331. It will be appreciated that the network connections shown are illustrative and other means of establishing a communications link between the computers may be used. The existence of any of various protocols such as TCP/IP, Ethernet, FTP, HTTP, HTTPS, and the like is presumed. Computing device 301 and/or terminals 341 or 351 may also be mobile devices (e.g., mobile phones, smartphones, PDAs, notebooks, tablets, other mobile devices) including various other components, such as a battery, speaker, and antennas.

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A system comprising:
a gateway device and a computing device associated with an application, wherein the gateway device comprises:
a processor; and
memory storing computer-executable instructions that, when executed by the processor of the gateway device, cause the gateway device to:
receive, from the computing device associated with the application, a request for a token, wherein the request comprises one or more of a secret associated with the application or an identifier associated with the application;
based on the request for the token, send, to the computing device, the token;

receive, from the computing device, a first request for data from an external service, wherein the first request for data comprises the token, and wherein the first request for data comprises one or more parameters for the data;

based on the first request for data from the external service, determine the external service;

send, to the external service, a request for a second token, wherein the request for the second token comprises one or more of a secret associated with the gateway device or an identifier associated with the gateway device;

receive, from the external service, the second token; and add the second token to the second request for data; and send, to the external service, a second request for data, wherein the second request for data comprises the one or more parameters for the data and the second token, wherein the computing device comprises:

a processor; and memory storing computer-executable instructions that, when executed by the processor of the computing device, cause the computing device to:

generate the first request for data from the external service by adding the token to the first request for data; and send, to the gateway device, the first request for data with the token added to the first request for data.

2. The system of claim 1, wherein the request for the token comprises the secret associated with the application, the identifier associated with the application, and a grant type associated with the application.

3. The system of claim 1, wherein the application comprises an application programming interface (API), and wherein the API is associated with one or more internal applications requesting the data.

4. The system of claim 1, wherein the memory of the gateway device stores computer-executable instructions that, when executed by the processor of the gateway device, cause the gateway device to:

before sending the token, authenticate the application based on one or more of the secret associated with the application or the identifier associated with the application, wherein sending the token is based on authenticating the application.

5. The system of claim 1, wherein a header field of the first request for data from the external service comprises the token, and wherein receiving the first request for data from the external service comprises receiving the first request for data having the header field comprising the token.

6. The system of claim 1, wherein the first request for data is encrypted using the token, and wherein the memory of the gateway device stores computer-executable instructions that, when executed by the processor of the gateway device, cause the gateway device to:

based on the token, decrypt the first request for data.

7. The system of claim 1, wherein the memory of the gateway device stores computer-executable instructions that, when executed by the processor of the gateway device, cause the gateway device to:

after determining the external service, determine, based on a mapping of external identifiers for external services to internal identifiers for the external services, an external identifier for the external service, wherein sending the second request for data comprises sending, to the external service and via the external identifier for the external service, the second request for data.

8. A method comprising:

receiving, by a gateway device and from a computing device associated with an application, a request for a token, wherein the request comprises one or more of a secret associated with the application or an identifier associated with the application;

based on the request for the token, sending, by the gateway device and to the computing device, the token;

receiving, by the gateway device and from the application, a first request for data from an external service, wherein the first request for data comprises the token, and wherein the first request for data comprises one or more parameters for the data;

based on the first request for data from the external service, determining, by the gateway device, the external service;

sending, by the gateway device and to the external service, a request for a second token, wherein the request for the second token comprises one or more of a secret associated with the gateway device or an identifier associated with the gateway device;

receiving, by the gateway device and from the external service, the second token;

adding the second token to the second request for data; and sending, by the gateway device and to the external service, a second request for data, wherein the second request for data comprises the one or more parameters for the data and the second token.

9. The method of claim 8, wherein the request for the token comprises the secret associated with the application, the identifier associated with the application, and a grant type associated with the application.

10. The method of claim 8, wherein the application comprises an application programming interface (API), and wherein the API is associated with one or more internal applications requesting the data.

11. The method of claim 8, further comprising:

before sending the token, authenticating the application based on one or more of the secret associated with the application or the identifier associated with the application, wherein sending the token is based on authenticating the application.

12. The method of claim 8, wherein a header field of the first request for data from the external service comprises the token, and wherein receiving the first request for data from the external service comprises receiving the first request for data having the header field comprising the token.

13. The method of claim 8, wherein the first request for data is encrypted using the token, the method further comprising:

based on the token, decrypting, by the gateway device, the first request for data.

14. The method of claim 8, further comprising:

after determining the external service, determining, by the gateway device and based on a mapping of external identifiers for external services to internal identifiers for the external services, an external identifier for the external service, wherein sending the second request for data comprises sending, to the external service and via the external identifier for the external service, the second request for data.

15. A non-transitory computer readable medium storing instructions thereon that, when read by a gateway device, causes the gateway device to:
receive, from a computing device associated with an application, a request for a token, wherein the request comprises one or more of a secret associated with the application or an identifier associated with the application;
based on the request for the token, send, to the computing device, the token;
receive, from the application, a first request for data from an external service, wherein the first request for data comprises the token, and wherein the first request for data comprises one or more parameters for the data;
based on the first request for data from the external service, determine the external service;
send, to the external service, a request for a second token, wherein the request for the second token comprises one or more of a secret associated with the gateway device or an identifier associated with the gateway device;
receive, from the external service, the second token;
add the second token to the second request for data; and
send, to the external service, a second request for data, wherein the second request for data comprises the one or more parameters for the data and the second token.

16. The non-transitory computer readable medium of claim 15, wherein a header field of the first request for data from the external service comprises the token, and wherein receiving the first request for data from the external service comprises receiving the first request for data having the header field comprising the token.

17. The non-transitory computer readable medium of claim 15, storing instructions thereon that, when read by the gateway device, causes the gateway device to:
after determining the external service, determine, based on a mapping of external identifiers for external services to internal identifiers for the external services, an external identifier for the external service,
wherein sending the second request for data comprises sending, to the external service and via the external identifier for the external service, the second request for data.

* * * * *